(12) United States Patent
Zhou et al.

(10) Patent No.: US 11,757,158 B2
(45) Date of Patent: Sep. 12, 2023

(54) ALL-SOLID-STATE LITHIUM BATTERY AND METHOD FOR FABRICATING THE SAME

(71) Applicant: BOE TECHNOLOGY GROUP CO., LTD., Beijing (CN)

(72) Inventors: Quanguo Zhou, Beijing (CN); Lijia Zhou, Beijing (CN); Rongjian Yan, Beijing (CN); Zhidong Wang, Beijing (CN); Jiuyang Cheng, Beijing (CN); Ronghua Lan, Beijing (CN); Yancheng Lu, Beijing (CN); Qingguo Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 329 days.

(21) Appl. No.: 16/764,118

(22) PCT Filed: Aug. 12, 2019

(86) PCT No.: PCT/CN2019/100180
§ 371 (c)(1),
(2) Date: May 14, 2020

(87) PCT Pub. No.: WO2020/038247
PCT Pub. Date: Feb. 27, 2020

(65) Prior Publication Data
US 2020/0395632 A1    Dec. 17, 2020

(30) Foreign Application Priority Data

Aug. 21, 2018 (CN) .......................... 201810956424.3

(51) Int. Cl.
*H01M 4/56* (2006.01)
*H01M 10/0565* (2010.01)
(Continued)

(52) U.S. Cl.
CPC ....... *H01M 10/0565* (2013.01); *H01M 4/131* (2013.01); *H01M 4/366* (2013.01);
(Continued)

(58) Field of Classification Search
CPC ............. H01M 10/0562; H01M 50/50; H01M 50/528; H01M 50/54; H01M 10/0525;
(Continued)

(56) References Cited

U.S. PATENT DOCUMENTS

| 8,637,996 B2 * | 1/2014 | Frey | ..................... | H01L 23/5226 |
| | | | | 257/E21.586 |
| 10,047,451 B2 * | 8/2018 | Gaben | ................. | H01M 4/0402 |

(Continued)

FOREIGN PATENT DOCUMENTS

| CN | 102163750 | 8/2011 |
| CN | 103069639 | 4/2013 |

(Continued)

OTHER PUBLICATIONS

Office action from Chinese Application No. 201810956424.3 dated Feb. 3, 2020.
(Continued)

*Primary Examiner* — Jeremiah R Smith
(74) *Attorney, Agent, or Firm* — Calfee, Halter & Griswold LLP

(57) ABSTRACT

An all-solid-state lithium battery is disclosed, including a substrate; and a plurality of layers of lithium battery units stacked on the substrate. Each layer of lithium battery unit of the plurality of layers of lithium battery units includes at least two electrode collector layers, a first electrode layer, an electrolyte layer and a second electrode layer. Two neighboring layers of lithium battery units share one of the electrode collector layers. A method for fabricating an all-solid-state lithium battery is further disclosed.

11 Claims, 17 Drawing Sheets

(51) Int. Cl.
*H01M 4/131* (2010.01)
*H01M 4/36* (2006.01)
*H01M 4/66* (2006.01)
*H01M 10/0525* (2010.01)
*H01M 10/0585* (2010.01)
*H01M 50/533* (2021.01)
*H01M 50/534* (2021.01)
*H01M 10/0562* (2010.01)

(52) U.S. Cl.
CPC ....... *H01M 4/661* (2013.01); *H01M 10/0525* (2013.01); *H01M 10/0585* (2013.01); *H01M 50/533* (2021.01); *H01M 50/534* (2021.01); H01M 10/0562 (2013.01); H01M 2300/0068 (2013.01)

(58) Field of Classification Search
CPC . H01M 2300/0068; H01M 2300/0071; H01M 50/533; H01M 50/534

See application file for complete search history.

(56) References Cited

U.S. PATENT DOCUMENTS

| | | | | |
|---|---|---|---|---|
| 2004/0185336 | A1* | 9/2004 | Ito | H01M 10/0562 |
| | | | | 429/162 |
| 2007/0259271 | A1* | 11/2007 | Nanno | H01M 4/5825 |
| | | | | 429/318 |
| 2013/0149593 | A1 | 6/2013 | Hayashi et al. | |
| 2014/0338817 | A1* | 11/2014 | Baba | H01M 4/622 |
| | | | | 156/89.12 |
| 2015/0340727 | A1* | 11/2015 | Iwamoto | H01M 10/0585 |
| | | | | 429/126 |
| 2016/0293907 | A1* | 10/2016 | Chen | H01M 10/0525 |
| 2018/0026308 | A1 | 1/2018 | Kamada et al. | |
| 2019/0214650 | A1* | 7/2019 | Sakamoto | H01M 4/661 |

FOREIGN PATENT DOCUMENTS

| | | |
|---|---|---|
| CN | 107658413 | 2/2018 |
| CN | 109119702 | 1/2019 |

OTHER PUBLICATIONS

International Search Report from PCT/CN2019/100180 dated Nov. 13, 2019.

* cited by examiner

ALL-SOLID-STATE LITHIUM BATTERY AND METHOD FOR FABRICATING THE SAME

RELATED APPLICATIONS

The present application is a 35 U.S.C. 371 national stage application of PCT International Application No. PCT/CN2019/100180, filed on Aug. 12, 2019, which claims the benefit of Chinese Patent Application No. 201810956424.3, filed on Aug. 21, 2018, the entire disclosures of which are incorporated herein by reference.

TECHNICAL FIELD

Embodiments of the present disclosure relate to the field of lithium batteries, and particularly to an all-solid-state lithium battery and a method for fabricating the same.

BACKGROUND

With the advent of miniature and wearable electronic products, flexible electronic device is developing towards the trend of portability, bendability, high efficiency, low cost and recyclability. Development of an all-solid-state lithium battery has become one of the cutting-edge researches in the field of energy storage. The all-solid-state lithium battery has advantages that other energy equipment do not have, e.g., high safety, low cost, capability of being charged and discharged at a high temperature, long cycle life, quick charge, and long endurance. The all-solid-state lithium battery has become the first choice in the energy field in the future.

SUMMARY

According to a first aspect of the present disclosure, there is provided an all-solid-state lithium battery, comprising:
   a substrate; and
   a plurality of layers of lithium battery units stacked on the substrate, wherein each layer of lithium battery unit of the plurality of layers of lithium battery units comprises at least two electrode collector layers, a first electrode layer, an electrolyte layer and a second electrode layer;
   wherein two neighboring layers of lithium battery units share one of the electrode collector layers.

In some embodiments, the electrode collector layers comprise a first electrode collector layer and a second electrode collector layer, first electrode collector layers of the odd-numbered layer of lithium battery units are connected by a first electrode collector connection part, and second electrode collector layers of the even-numbered layer of lithium battery units are connected by a second electrode collector connection part.

In some embodiments, electrolyte layers of two neighboring layers of lithium battery units are connected by electrolyte connection part.

In some embodiments, each layer of lithium battery unit comprises: the first electrode collector layer, the first electrode layer, the electrolyte layer, the second electrode layer, and the second electrode collector layer, which are arranged in this order in a direction from the first electrode collector layer of said layer of lithium battery unit to the second electrode collector layer of said layer of lithium battery unit.

In some embodiments, the electrolyte connection part is provided with a first via and a second via, the first via is provided with the first electrode collector connection part, which connects first electrode collector layers of respective lithium battery unit; and
   the second via is provided with the second electrode collector connection part, which connects second electrode collector layers of respective lithium battery unit.

In some embodiments, the first via and the second via are perpendicular to the substrate.

In some embodiments, the electrolyte connection part and the electrolyte layer comprise a same material.

In some embodiments, the electrolyte layer is made from at least one of lithium phosphate, lithium oxide and lithium titanium phosphate.

In some embodiments, the first electrode collector layer and the first electrode collector layer connection part comprise a same material, and the material comprises aluminum.

In some embodiments, the second electrode collector layer and the second electrode collector layer connection part comprise a same material, and the material comprises copper.

In some embodiments, the all-solid-state lithium battery further comprises a protection layer, which is arranged at the periphery of the plurality of layers of lithium battery units.

In some embodiments, the first electrode collector layer is a cathode collector layer, the first electrode layer is a cathode layer, the second electrode layer is an anode layer, and the second electrode collector layer is an anode collector layer.

In some embodiments, the first electrode collector layer is an anode collector layer, the first electrode layer is an anode layer, the second electrode layer is a cathode layer, and the second electrode collector layer is a cathode collector layer.

In some embodiments, the first electrode collector connection part and the second electrode collector connection part contact the electrolyte layer directly.

According to a second aspect of the present disclosure, there is provided a method for fabricating an all-solid-state lithium battery, comprising:
   providing a substrate;
   stacking a plurality of layers of lithium battery units on the substrate, wherein each layer of lithium battery unit of the plurality of layers of lithium battery units comprises at least two electrode collector layers, a first electrode layer, an electrolyte layer and a second electrode layer;
   wherein two neighboring layers of lithium battery units share one of the electrode collector layers.

In some embodiments, the electrode collector layers comprise a first electrode collector layer and a second electrode collector layer, and stacking the plurality of layers of lithium battery units on the substrate comprises:
   forming a first electrode collector connection part, which connects first electrode collector layers of the odd-numbered layer of lithium battery units, and
   forming a second electrode collector connection part, which connects second electrode collector layers of the even-numbered layer of lithium battery units.

In some embodiments, stacking the plurality of layers of lithium battery units on the substrate comprises:
   forming the first electrode collector layer, the first electrode layer, the electrolyte layer on the substrate by deposition, forming the second electrode layer by evaporation, and forming the second electrode collector layer by deposition, to form the first layer of lithium battery unit;
   forming the second electrode layer by evaporation on the second electrode collector layer of the first layer of lithium battery unit, in a direction of the first layer of lithium battery unit away from the substrate, and forming the electrolyte layer, the electrolyte connection part, the first electrode layer, the first electrode collector layer and the first electrode collector connection part by deposition, to form the second layer of lithium battery unit;

forming the first electrode layer, the electrolyte layer and the electrolyte connection part by deposition in a direction of the second layer of lithium battery unit away from the substrate, forming the second electrode layer by evaporation, and forming the second electrode collector layer and the second electrode collector connection part by deposition, to form the third layer of lithium battery unit;

in a direction of the third layer of lithium battery unit away from the substrate, repeating the step of forming the second layer of lithium battery unit and the step of forming the third layer of lithium battery unit to alternately form the even-numbered layer and odd-numbered layer of lithium battery units.

In some embodiments, after forming the electrolyte layer and the electrolyte connection part by deposition, the method further comprises:

forming a first via and a second via in the electrolyte connection part by etching, wherein the first via is provided with the first electrode collector connection part, and the first electrode collector connection part connects first electrode collector layers of respective lithium battery unit; and the second via is provided with the second electrode collector connection part, the second electrode collector connection part connects the second electrode collector layer of respective lithium battery unit.

In some embodiments, after stacking the plurality of layers of lithium battery units on the substrate, the method further comprises:

forming the protection layer at a periphery of the plurality of layers of lithium battery units.

In some embodiments, the first electrode collector layer is a cathode collector layer, the first electrode layer is a cathode layer, the second electrode layer is an anode layer, and the second electrode collector layer is an anode collector layer.

Other features and advantages of the present disclosure will be elucidated in the following description, and will be partially apparent from the description, or will be understood by implementing the present disclosure. The objects and other advantages of the present disclosure can be realized and obtained by the structures specifically disclosed in the description, claims and accompanying drawings.

BRIEF DESCRIPTION OF THE DRAWINGS

To make the objects, the technical solutions and the advantages of embodiments of the present disclosure more apparent, the technical solutions of the embodiments of the present disclosure will be described in detail hereinafter in conjunction with the drawings of the embodiments of the present disclosure.

DETAILED DESCRIPTION OF EMBODIMENTS

To make the objects, the technical solutions and the advantages of embodiments of the present disclosure more apparent, the technical solutions of the embodiments of the present disclosure will be described in detail hereinafter in conjunction with the drawings of the embodiments of the present disclosure.

Steps shown in the flow chart of the accompanying drawings can be performed in a computer system such as a set of computer-executable instructions. Although a logical sequence is shown in the flow chart, the shown or described steps can be performed in other sequences in some cases.

Unless otherwise defined, the technical or scientific terms used in the present disclosure shall have the general meanings understandable for those ordinarily skilled in the field of the present disclosure. The wordings such as "first", "second" or similar used in the description and claims of the present disclosure shall not represent any order, number or importance, but are used for distinguishing different elements. Similarly, the words such as "an", "a" or similar shall not represent limitation of numbers, but mean existence of at least one. The phrases "couple", "connect" or similar are not limited to physical or mechanical connection, but also include electrical connection, no matter directly or indirectly. The phrases "upper", "lower", "left", "right" and etc. shall be used only to represent relative positions, wherein, when the absolute position of the described object is changed, the relative positions may be changed accordingly.

Currently, in order to meet the need for a lighter and thinner lithium battery with longer life, an existing all-solid-state lithium battery comprises layered batteries which are formed in the form of thin films. An existing stacked lithium battery is formed by stacking a plurality of layered batteries in independent packages. In each independent layered battery, connectors of cathode layers are connected together, and connectors of anode layers are connected together. The inventors have found that in the stacked lithium battery, connectors of cathode layers and anode layers are prone to erode, which causes electrical resistance to increase. As a result, the all-solid-state lithium battery has a reduced reliability, and this finally causes reduction in the lifetime of all-solid-state lithium battery.

Figure 1:
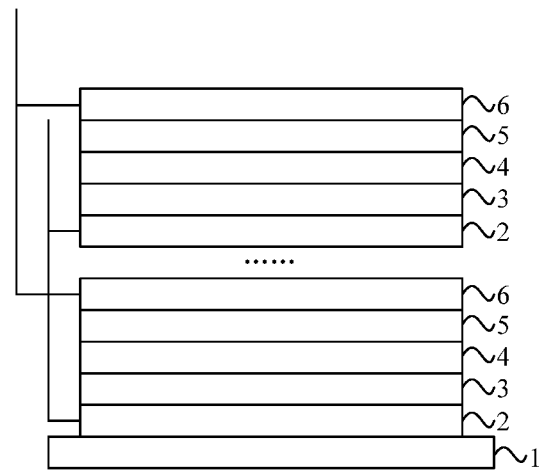
FIG. 1 is a structural view for illustrating an existing all-solid-state lithium battery.

FIG. 1 is a structural view for an existing all-solid-state lithium battery. As shown in FIG. 1, the all-solid-state lithium battery comprises: a substrate 1, and cathode collectors 2, cathodes 3, electrolytes 4, anodes 5 and anode collectors 6 on the substrate 1. The cathode collectors 2 act as connector leading electrodes by means of aluminum sheets, the anode collectors 6 act as connector leading electrodes by means of copper sheets or nickel sheets, so as to form a stacked lithium battery. In particular, in the stacked lithium battery, a plurality of cathode collector connectors are connected together, and a plurality of anode collector connectors are connected together. The cathode collectors 2, the cathodes 3, the electrolytes 4, the anodes 5 and the anode collectors 6 constitute a single independent layered battery.

However, since the plurality of cathode collector connectors and the plurality of anode collector connectors in the existing all-solid-state lithium battery are exposed to air, and are prone to be affected by moisture. This leads to erosion and increase in the electrical resistance, so that the reliability of the all-solid-state lithium battery is reduced, which finally causes reduction in the lifetime of the all-solid-state lithium battery. In addition, each independent layered battery has as to be packaged independently, which increases the complexity of process.

In order to solve the above technical problems, embodiments of the present disclosure provide an all-solid-state lithium battery and a method for fabricating the same, which can not only increase the reliability of the all-solid-state lithium battery, but can also extend the lifetime of the all-solid-state lithium battery. Meanwhile, the construction is more compact, the space is saved and the package process is simplified.

Embodiments of the present disclosure are particularly explained hereinafter.

Figure 2A:
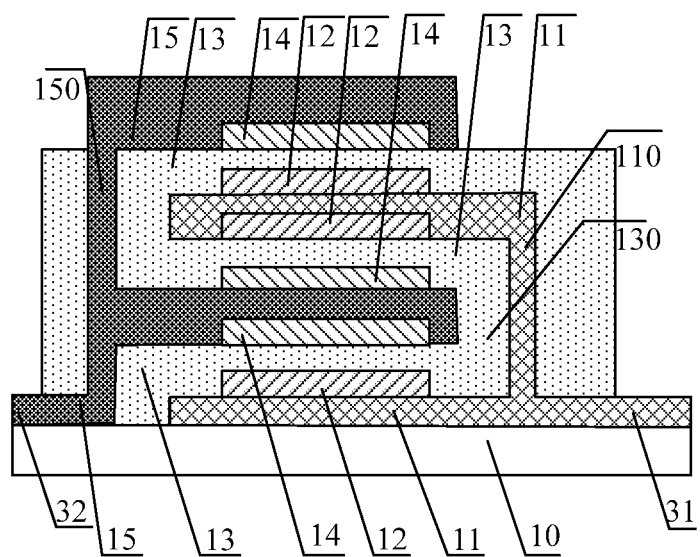
FIG. 2A is a structural view for illustrating an all-solid-state lithium battery in an embodiment of the present disclosure.
Figure 2B:
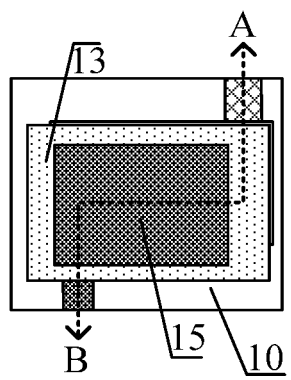
FIG. 2B is a top view of FIG. 2A.
Figure 3:
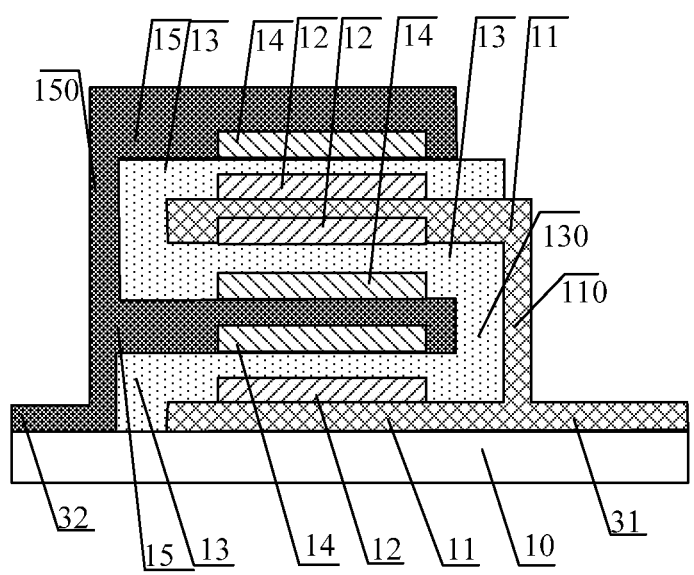
FIG. 3 is a structural view for illustrating an all-solid-state lithium battery in an embodiment of the present disclosure.

FIG. 2A is a structural view for an all-solid-state lithium battery in an embodiment of the present disclosure, FIG. 2B is a top view of FIG. 2A, and FIG. 2A is a cross-sectional view along A-B of FIG. 2B. In the present disclosure, unless otherwise defined, the structural views or the schematic views of fabricating method in FIG. 2A-FIG. 31 are cut along a same direction as A-B or a similar direction. FIG. 3 is a structural view for an all-solid-state lithium battery in an embodiment of the present disclosure. As shown in FIG. 2A and FIG. 3, the all-solid-state lithium battery in an embodiment of the present disclosure comprises: a substrate 10 and a plurality of layers of lithium battery units stacked on the substrate 10. Each layer of lithium battery unit comprises: a cathode collector layer 11, a cathode layer 12, an electrolyte layer 13, an anode layer 14 and an anode collector layer 15. The cathode collector layers 11 of a pair of neighboring lithium battery units are connected by a cathode collector connection part 110, and the pair of neighboring lithium battery units share the anode collector layer 15. Optionally, the anode collector layers 15 of a pair of neighboring lithium battery units are connected by an anode collector connection part 150, the pair of neighboring lithium battery units share the cathode collector layer 11. The all-solid-state lithium battery in embodiments of the present disclosure can be electrically connected with the outside by connectors 31, 32 of the collector layers close to the substrate.

Optionally, the substrate 10 can be glass, plastic, polymer, metal plate, silicon sheet, quartz, ceramic, or mica. Alternatively, in order to increase bending performance of the all-solid-state lithium battery, the substrate can be a flexible substrate, which can be PI (polyimide), PET (Polyethylene Terephthalate), zirconium oxide, aluminum oxide, or the like.

In particular, the all-solid-state lithium battery in an embodiment of the present disclosure can comprise at least two lithium battery units, and the specific number is determined according to practical need. It is noted that in the cases of FIG. 2A and FIG. 3, the all-solid-state lithium battery comprise three lithium battery units. In FIG. 2A and FIG. 3, the first layer of lithium battery unit and the second layer of lithium battery unit share the anode collector layer 15. The cathode collector layers of the first layer of lithium battery unit and the second layer of lithium battery unit are connected by the cathode collector connection part 110. The second layer of lithium battery unit and the third layer of lithium battery unit share the cathode collector layer 11. The anode collector layers of the second layer of lithium battery unit and the third layer of lithium battery unit are connected by the anode collector connection part 150.

The anode collector layer 15 and the anode collector connection part 150 can have a bended shape, and the cathode collector layer 11 and the cathode collector connection part 110 can have a bended shape.

Further, in embodiments of the present disclosure, since the neighboring lithium battery units share the cathode collector layer or the anode collector layer, the endurance of the all-solid-state lithium battery is ensured, and the thickness of the all-solid-state lithium battery is also reduced.

The all-solid-state lithium battery in an embodiment of the present disclosure can comprise: a substrate and a plurality of layers of lithium battery units stacked on the substrate. Each layer of lithium battery unit can comprise: a cathode collector layer, a cathode layer, an electrolyte layer, an anode layer and an anode collector layer. The cathode collector layers of a pair of neighboring lithium battery units are connected by a cathode collector connection part, and the pair of neighboring lithium battery units share the anode collector layer. Optionally, the anode collector layers of a pair of neighboring lithium battery units are connected by an anode collector connection part, and the pair of neighboring lithium battery units share the cathode collector layer.

Optionally, as an implementation, the cathode layer of the odd-numbered layer of lithium battery unit is arranged at a side of the cathode collector layer away from the substrate, and the anode layer of the odd-numbered layer of lithium battery unit is arranged at a side of the anode collector layer close to the substrate; the cathode layer of the even-numbered layer of lithium battery unit is arranged at a side of the cathode collector layer close to the substrate, and the anode layer of the even-numbered layer of lithium battery unit is arranged at a side of the anode collector layer away from the substrate, and the electrolyte layer of each layer of lithium battery unit is arranged between the cathode layer and the anode layer. It is noted that both FIG. 2A and FIG. 3 are explained by taking this implementation as an example.

Optionally, as another implementation, the anode layer of the odd-numbered layer of lithium battery is arranged at a side of the anode collector layer away from the substrate, and the cathode layer of the odd-numbered layer of lithium battery is arranged at a side of the cathode collector layer close to the substrate; the cathode layer of the even-numbered layer of lithium battery unit is arranged at a side of the cathode collector layer away from the substrate, and the anode layer of the even-numbered layer of lithium battery unit is arranged at a side of the anode collector layer close to the substrate, and the electrolyte layer of each layer of lithium battery unit is arranged between the cathode layer and the anode layer.

Optionally, as shown in FIG. 2A and FIG. 3, the electrolyte layers 13 of neighboring lithium battery units are connected by an electrolyte connection part 130.

Optionally, in embodiments of the present disclosure, areas of the cathode collector layer and the cathode layer are not subject to specific limitations. The area of the cathode collector layer can be larger than the area of the cathode layer, or can be smaller than the area of the cathode layer.

Figure 4:
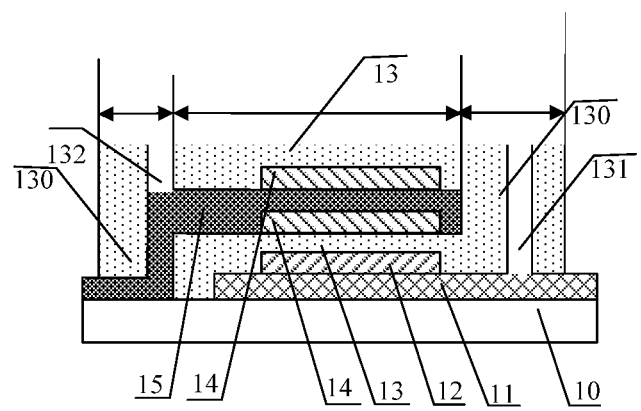
FIG. 4 is a partially structural view for illustrating the all-solid-state lithium battery of FIG. 2A.

Optionally, FIG. 4 is a partially structural view of the all-solid-state lithium battery of FIG. 2A. As shown in FIG. 4, the electrolyte connection part of the second layer of lithium battery is provided with a first via 131 and a second via 132. The first via 131 can be provided with a cathode collector connection part to connect the cathode collector layers 11 of respective lithium battery units, and the second via 132 can be provided with an anode collector connection part to connect the anode collector layers 15 of respective lithium battery units.

The number of the first via 131 can be one or more, e.g. 2, and the number of the second via 132 can be one or more, e.g. 2. The first via 131 and the second via 132 can be perpendicular to the substrate 10.

In the all-solid-state lithium battery of FIG. 3, anode collector layers and cathode collector layers of neighboring lithium battery units are electrically connected at the periphery of the electrolyte layer. This simplifies the process, as compared with the all-solid-state lithium battery of FIG. 2A.

In the all-solid-state lithium battery of FIG. 2A, the electrolyte connection part 130 is perforated to form vias. By means of the vias in the electrolyte connection part 130, electrical connection between the anode collector layers 15 and electrical connection between the cathode collector layers 11 are realized. This further reduces the area of the collector layer that contacts the outside, increases the reliability of the all-solid-state lithium battery, and extends the lifetime.

Optionally, the electrolyte connection part 130 and the electrolyte layer 13 can comprise a same material. The electrolyte layer 13 can be formed by a deposition process, and can comprise at least one of lithium phosphate, lithium oxide, and lithium titanium phosphate.

Optionally, the electrolyte connection part 130 can be formed by a deposition process.

Optionally, the cathode collector layer 11 and the cathode collector connection part 110 can comprise a same material. The cathode collector layer can be formed by a deposition process, and can comprise aluminum. In order to ensure stability of the collector inside the all-solid-state lithium battery, aluminum has a purity of not less than 98%.

Optionally, the cathode collector connection part 110 can be formed by a deposition process.

Optionally, the anode collector layer 15 and the anode collector connection part 150 can comprise a same material. The anode collector layer can be formed by a deposition process, and can comprise copper. In order to ensure stability of the collector inside the all-solid-state lithium battery, copper has a purity of not less than 98%.

Optionally, the anode collector connection part 150 can be formed by a deposition process.

Optionally, the cathode layer 12 can be formed by a deposition process, and can comprise $LiNiCoAlO_2$ (i.e., NCA), lithium-rich material, lithium manganite, lithium titanate, lithium iron phosphate. Further, the cathode layer is generally made from a composite electrode. Apart from the electrode active substance, the cathode layer further comprises a solid state electrolyte and a conductive agent, which function to transport ions and electrons in the electrode.

Optionally, the anode layer 14 can be formed by evaporation, and comprises one of or a combination of at least two of metal lithium, alloys, and oxides. Optionally, the alloys comprise lithium alloys and/or silicon-based alloys.

Figure 5:
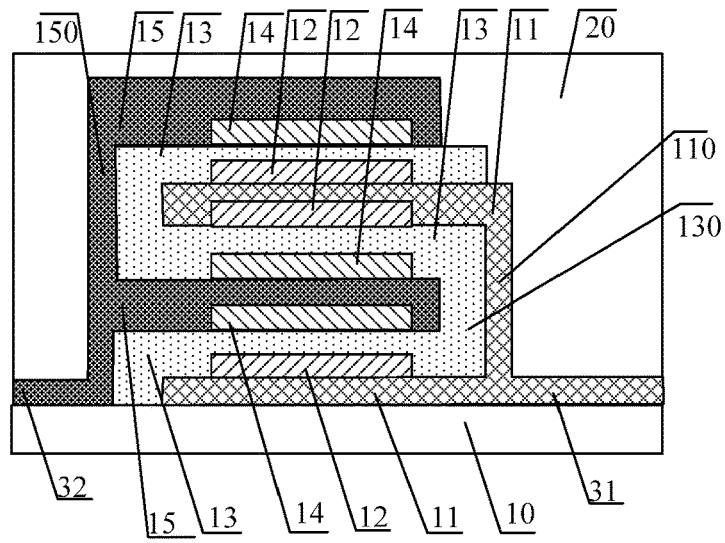
FIG. 5 is a structural view for illustrating a solid-state lithium battery in an embodiment of the present disclosure.

Optionally, FIG. 5 is a structural view for a solid-state lithium battery in an embodiment of the present disclosure. As shown in FIG. 5, in embodiments of the present disclosure, the all-solid-state lithium battery further comprises a protection layer 20, which is arranged at the periphery of the plurality of layers of lithium battery units.

Embodiments of the present disclosure further describe the basic operating principle of the all-solid-state lithium battery. During charging, lithium ions in the cathode layer are de-intercalated from the crystal lattice, and migrate in the electrolyte layer to the anode layer, while electrons migrate to the anode layer through an external circuit. Lithium ions and electrons are recombined into lithium atoms at the anode layer, alloyed, or imbedded into the anode layer. The discharging process is contrast to the charging process. In this case, electrons form a current to drive the electronic device by an external circuit.

According to technical solutions in embodiments of the present disclosure, a collector is shared by two neighboring layers of lithium battery units, so that the all-solid-state lithium battery has a more compact construction to save space. In addition, the collector material is saved, and the mass energy density of the all-solid-state lithium battery is increased. By connecting cathode collector layers of neighboring lithium battery units or anode collector layers of neighboring lithium battery units, there is no need to form connectors for the cathode collector layer and the anode collector layer of each layer of lithium battery unit. It is not required to form a separate lead for a single layer of lithium battery unit. It is not required to separately package a single layer of lithium battery unit. By integrating leads of a plurality of layers lithium battery units with the package, the problems of erosion of connectors due to exposure to air and increase in electrical resistance are avoided, the package process is saved, the reliability of the all-solid-state lithium battery is increased, and the lifetime of the all-solid-state lithium battery is extended.

Figure 6:
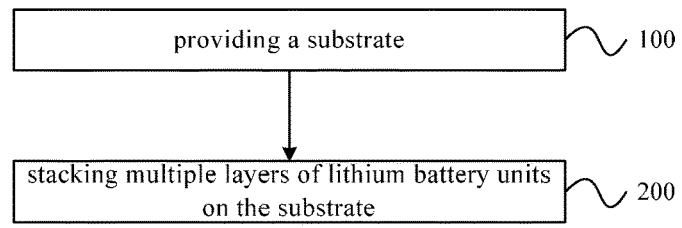
FIG. 6 is a flow chart for illustrating a method for fabricating an all-solid-state lithium battery in an embodiment of the present disclosure.

Based on the inventive concept of the above embodiments, embodiments of the present disclosure further provide a method for fabricating an all-solid-state lithium battery. FIG. 6 is a flow chart of a method for fabricating an all-solid-state lithium battery in an embodiment of the present disclosure. As shown in FIG. 6, the method for fabricating an all-solid-state lithium battery in an embodiment of the present disclosure particularly comprises the following steps:

Step 100, providing a substrate.

Optionally, the substrate can be glass, plastic, polymer, metal plate, silicon sheets, quartz, ceramic, or mica. Alternatively, the substrate can be a flexible substrate, such as PI, PET, zirconium oxide, aluminum oxide, or the like.

Step 200, stacking the plurality of layers of lithium battery units on the substrate.

In the present embodiment, each layer of lithium battery unit comprises: a cathode layer, an electrolyte layer, an anode layer, a cathode collector layer and an anode collector layer; wherein the cathode collector layers of a pair of neighboring lithium battery units are connected by a cathode collector connection part, and the pair of neighboring lithium battery units share the anode collector layer. Optionally, the anode collector layers of a pair of neighboring lithium battery units are connected by an anode collector connection part, and the pair of neighboring lithium battery units share the cathode collector layer.

In particular, the all-solid-state lithium battery in an embodiment of the present disclosure can comprise at least two lithium battery units, and the specific number is determined according to practical need.

The anode collector layer and the anode collector connection part can have a bended shape, and the cathode collector layer and the cathode collector connection part can have a bended shape.

Further, in embodiments of the present disclosure, the cathode collector layer or the anode collector layer is shared by neighboring lithium battery units, the endurance of the all-solid-state lithium battery is ensured, and the thickness of the all-solid-state lithium battery is also reduced.

The method for fabricating an all-solid-state lithium battery in an embodiment of the present disclosure can comprise: providing a substrate, stacking the plurality of layers of lithium battery units on the substrate; wherein each layer of lithium battery unit can comprise: a cathode layer, an electrolyte layer, an anode layer, a cathode collector layer and an anode collector layer; wherein the cathode collector layers of a pair of neighboring lithium battery units are connected by a cathode collector connection part, and the pair of neighboring lithium battery units share the anode collector layer. Optionally, the anode collector layers of a pair of neighboring lithium battery units are connected by an anode collector connection part, and the pair of neighboring lithium battery units share the cathode collector layer.

Optionally, as an implementation, step 200 particularly comprises: forming the cathode collector layer, the cathode layer and the electrolyte layer on the substrate by deposition in this order; forming an anode layer on the electrolyte layer by evaporation; forming the anode collector layer on the anode layer by deposition, to form a first layer of lithium battery unit; forming the anode layer on the odd-numbered layer of lithium battery unit by evaporation; forming the electrolyte layer and the electrolyte connection part on the anode layer by deposition, wherein the electrolyte connection part is configured to connect electrolyte layers of neighboring lithium battery units; forming the cathode layer on the electrolyte layer by deposition; forming the cathode collector layer and the cathode collector connection part on the cathode layer by deposition, to form the even-numbered layer of lithium battery unit; forming the cathode layer on the even-numbered layer of lithium battery unit by deposition; forming the electrolyte layer and the electrolyte connection part on the cathode layer by deposition; forming the anode layer on the electrolyte layer by evaporation; forming the anode collector layer and the anode collector connection part on the anode layer by deposition, to form the odd-numbered layer of lithium battery unit.

In particular, in the above implementation, the cathode collector layer is firstly arranged on the substrate. It is noted that in the second layer of lithium battery unit and the lithium battery units over the second layer of lithium battery unit, the electrolyte layer and the electrolyte connection part are formed at the same time by deposition, the anode collector layer and the anode collector connection part in the odd-numbered layer of lithium battery unit are formed at the same time by deposition, and the cathode collector layer and the cathode collector connection part in the even-numbered layer of lithium battery unit are formed at the same time by deposition.

Optionally, as another implementation, step 200 particularly comprises: forming the anode collector layer on the substrate by deposition; forming the anode layer on the anode collector layer by evaporation; forming the electrolyte layer, the cathode layer and the cathode collector layer on the anode layer in this order by deposition, to form the first layer of lithium battery unit; forming the cathode layer on the odd-numbered layer of lithium battery unit by evaporation; forming the electrolyte layer and the electrolyte connection part on the cathode layer by deposition, wherein the electrolyte connection part is configured to connect electrolyte layers of neighboring lithium battery units; forming the anode layer on the electrolyte layer by evaporation; forming the anode collector layer and the anode collector connection part on the anode layer by deposition, to form the even-numbered layer of lithium battery unit; forming the anode layer on the even-numbered layer of lithium battery unit by evaporation; forming the electrolyte layer and the electrolyte connection part on the anode layer by deposition; forming the cathode layer on the electrolyte layer by deposition; forming the cathode collector layer and the cathode collector connection part on the cathode layer by deposition, to form the odd-numbered layer of lithium battery unit.

In particular, in the above implementation, the anode collector layer is firstly arranged on the substrate. It is noted that in the second layer of lithium battery unit and the lithium battery units over the second layer of lithium battery unit, the electrolyte layer and the electrolyte connection part are formed at the same time by deposition, the anode collector layer and the anode collector connection part in the even-numbered layer of lithium battery unit are formed at the same time by deposition, and the cathode collector layer and the cathode collector connection part in the odd-numbered layer of lithium battery unit are formed at the same time by deposition.

Optionally, after forming the electrolyte layer and the electrolyte connection part on the cathode layer by deposition, in an embodiment of the present disclosure, the method further comprises: forming a first via and a second via in the electrolyte connection part by etching, the first via is provided with a cathode collector connection part for connecting cathode collector layers of lithium battery units, and the second via is provided with an anode collector connection part for connecting anode collector layers of lithium battery units.

Optionally, after forming the electrolyte layer and the electrolyte connection part on the anode layer by deposition, in an embodiment of the present disclosure, the method further comprises: forming the first via and the second via in the electrolyte connection part by etching, wherein the first via is provided with a cathode collector connection part for connecting cathode collector layers of lithium battery units, and the second via is provided with an anode collector connection part for connecting anode collector layers of lithium battery units.

Optionally, the electrolyte connection part and the electrolyte layer can comprise a same material, such as lithium phosphate, lithium oxide or lithium titanium phosphate.

Optionally, the cathode collector layer and the cathode collector layer connection part can comprise a same material, such as aluminum. In order to ensure stability of the collector inside the all-solid-state lithium battery, aluminum has a purity of not less than 98%.

Optionally, the cathode collector layer connection part can be formed by a deposition process.

Optionally, the anode collector layer and the anode collector layer connection part can comprise a same material. The anode collector layer comprises e.g., copper. In order to ensure stability of the collector inside the all-solid-state lithium battery, copper has a purity of not less than 98%.

Optionally, the material for forming cathode layer can comprise $LiNiCoAlO_2$ (i.e., NCA), lithium-rich material, lithium manganite, lithium titanate, lithium iron phosphate. Further, the cathode layer is generally made from a composite electrode. Apart from the electrode active substance, the cathode layer further comprises a solid state electrolyte and a conductive agent, which function to transport ions and electrons in the electrode.

Optionally, the material for the anode layer can comprise one of or a combination of at least two of metal lithium, alloys, and oxides. Optionally, the alloys comprise lithium alloys and/or silicon-based alloys.

Optionally, after step 200, in an embodiment of the present disclosure, the method further can comprise: forming a protection layer on the plurality of layers of lithium battery units.

It is noted that the deposition process comprises magnetron sputtering, pulsed laser deposition, or plasma assisted electron beam evaporation. Magnetron sputtering is also referred to as radio frequency magnetron sputtering. The target material for magnetron sputtering is selected or formed according to the raw material, and can be formed by a conventional method. The pulsed laser deposition is also referred to as pulsed laser ablation, and is a means for forming a layer or thin film by bombarding an object with laser, and depositing the bombarded substance on different substrates. In plasma assisted electron beam evaporation, "evaporation" means depositing a film by thermal evaporation. In plasma assisted electron beam evaporation, electrons in the electron beam obtains kinetic energy in an electric field with a potential difference U, and then bombard the target material, so that the target material is heated to vaporize for deposition by evaporation. Deposition by evaporation is a method in which a thin film is formed under high vacuum by heating a metal or non-metallic material, so that it is heated and condenses on the surface of the workpiece to be to be evaporated (a metal, semiconductor or insulator).

Alternatively, the anode thin film can be formed by evaporation, and the evaporation process can comprise thermal evaporation under vacuum.

Hereinafter, the method for fabricating an all-solid-state lithium battery in an embodiment of the present disclosure will be further described with reference to FIGS. 2A-2B, 7A, 20B, by taking an example in which the all-solid-state lithium battery comprises three layers of lithium battery units, the cathode collector layer is firstly arranged on the substrate, and the electrolyte connection part is perforated.

Figure 7A:
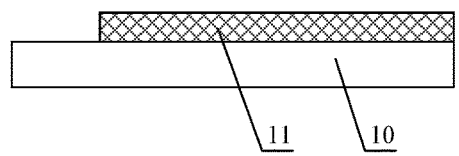
FIG. 7A is a schematic view for illustrating a method for fabricating an all-solid-state lithium battery in an embodiment of the present disclosure.
Figure 7B:
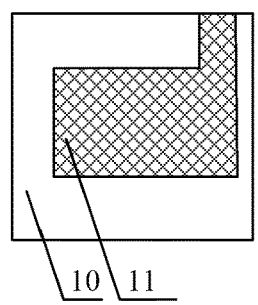
FIG. 7B is a top view of FIG. 7A.

Step 301, forming the cathode collector layer 11 on the substrate 10 by deposition, as particularly shown in FIG. 7A and FIG. 7B, FIG. 7B being a top view of FIG. 7A.

Figure 8A:
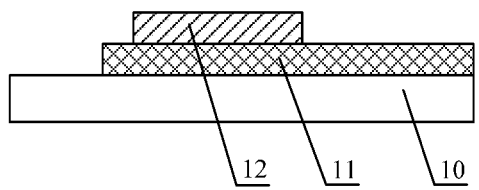
FIG. 8A is a schematic view for illustrating a method for fabricating an all-solid-state lithium battery in an embodiment of the present disclosure.
Figure 8B:
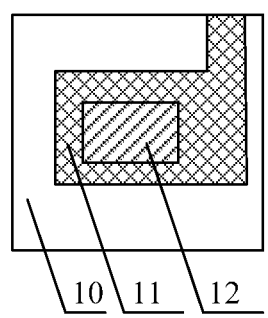
FIG. 8B is a top view of FIG. 8A.

Step 302, forming the cathode layer 12 on the cathode collector layer 11 by deposition, as particularly shown in FIGS. 8A and 8B, FIG. 8B being a top view of FIG. 8A.

In particular, an orthogonal projection of the cathode collector layer 11 on the substrate 10 can be larger than an orthogonal projection of the cathode layer 12 on the substrate 10, and can also be smaller than the orthogonal projection of the cathode layer 12 on the substrate. In FIGS. 8A-8B, the orthogonal projection of the cathode collector layer 11 on the substrate 10 is larger than the orthogonal projection of the cathode layer 12 on the substrate 10.

Figure 9A:
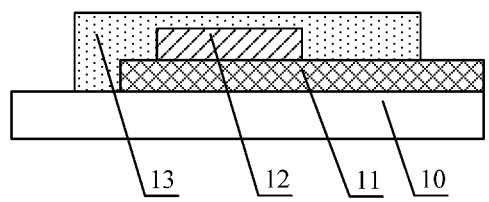
FIG. 9A is a schematic view for illustrating a method for fabricating an all-solid-state lithium battery in an embodiment of the present disclosure.
Figure 9B:
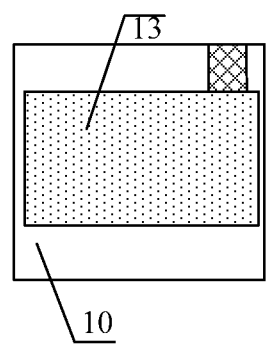
FIG. 9B is a top view of FIG. 9A.

Step 303, forming the electrolyte layer 13 on the cathode layer 12 by deposition, as particularly shown in FIGS. 9A and 9B.

In particular, a distance between the left side of the electrolyte layer 13 and the left side of substrate is smaller than a distance between the left side of the cathode collector layer 11 and the left side of the substrate, and a distance between the right side of the electrolyte layer 13 and the right side of the substrate is larger than a distance between the right side of the cathode collector layer 11 and the right side of the substrate.

Figure 10A:
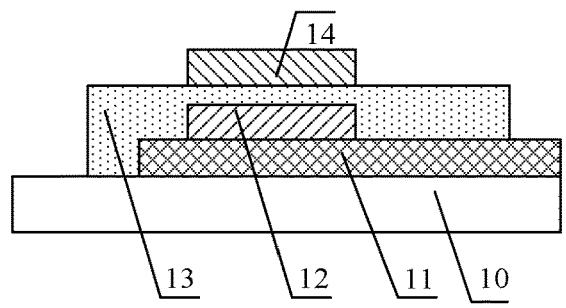
FIG. 10A is a schematic view for illustrating a method for fabricating an all-solid-state lithium battery in an embodiment of the present disclosure.
Figure 10B:
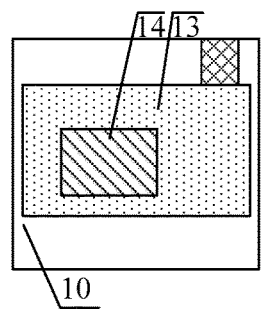
FIG. 10B is a top view of FIG. 10A.

Step 304, forming the anode layer 14 on the electrolyte layer 13 by evaporation, as particularly shown in FIGS. 10A and 10B.

The orthogonal projection of the anode layer 14 on the substrate 10 can overlap (coincide with) the orthogonal projection of the cathode layer 12 on the substrate.

Figure 11A:
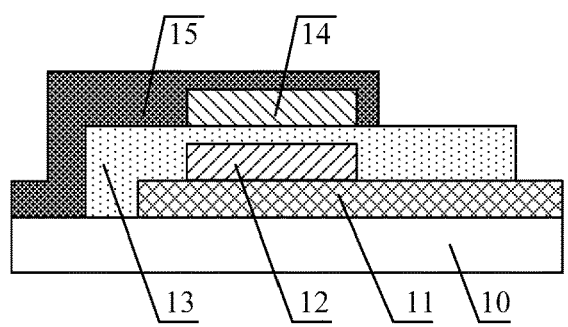
FIG. 11A is a schematic view for illustrating a method for fabricating an all-solid-state lithium battery in an embodiment of the present disclosure.
Figure 11B:
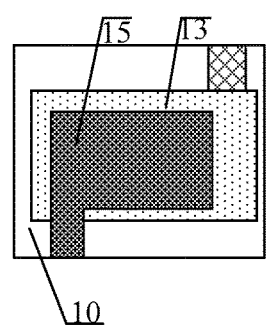
FIG. 11B is a top view of FIG. 11A.

Step 305, forming the anode collector layer 15 the anode layer 14 by deposition, to form the first layer of lithium battery unit, as particularly shown in FIGS. 11A and 11B.

In particular, the distance between the left side of the electrolyte layer and the left side of the substrate is larger than the distance between the left side of the anode collector layer and the left side of the substrate, and the distance between the right side of the electrolyte layer and the right side of the substrate is smaller than the distance between the right side of the anode collector layer and the right side of the substrate.

Figure 12A:
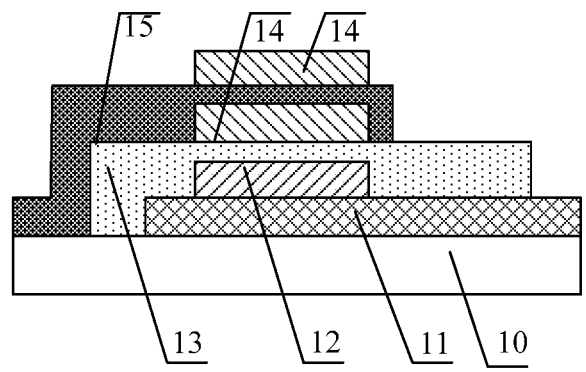
FIG. 12A is a schematic view for illustrating a method for fabricating an all-solid-state lithium battery in an embodiment of the present disclosure.
Figure 12B:
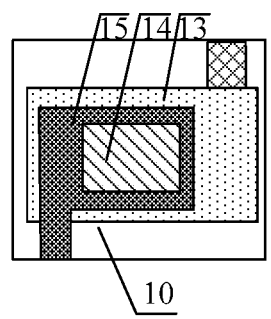
FIG. 12B is a top view of FIG. 12A.

Step 306, forming the anode layer 14 on the anode collector layer 15 by evaporation, as particularly shown in FIGS. 12A and 12B.

Figure 13A:
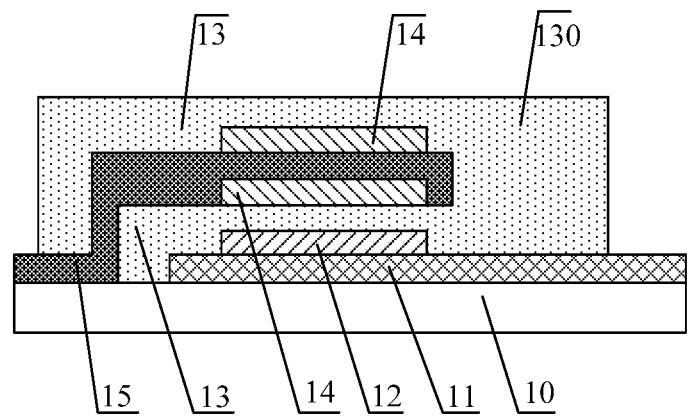
FIG. 13A is a schematic view for illustrating a method for fabricating an all-solid-state lithium battery in an embodiment of the present disclosure schematic view.
Figure 13B:
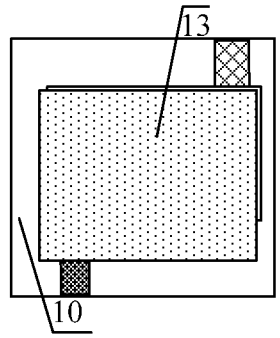
FIG. 13B is a top view of FIG. 13A.

Step 307, forming the electrolyte layer 13 and the electrolyte connection part 130 on the anode layer 14 by deposition, as particularly shown in FIGS. 13A and 13B.

The electrolyte layer 13 of the second layer of lithium battery unit and the electrolyte layer 13 of the first layer of lithium battery unit are connected by the electrolyte connection part 130.

Figure 14A:
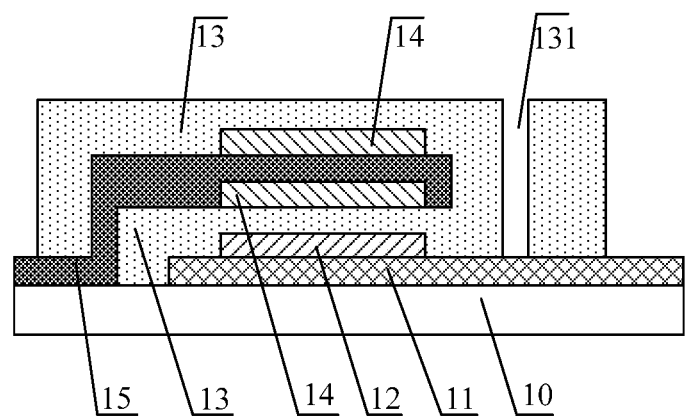
FIG. 14A is a schematic view for illustrating a method for fabricating an all-solid-state lithium battery in an embodiment of the present disclosure.
Figure 14B:
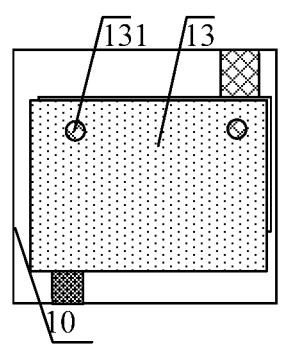
FIG. 14B is a top view of FIG. 14A.

Step 308, forming the first via 131 in the electrolyte connection part 130 by etching, as particularly shown in FIGS. 14A and 14B. As an example, the number of the first via 131 is two.

Figure 15A:
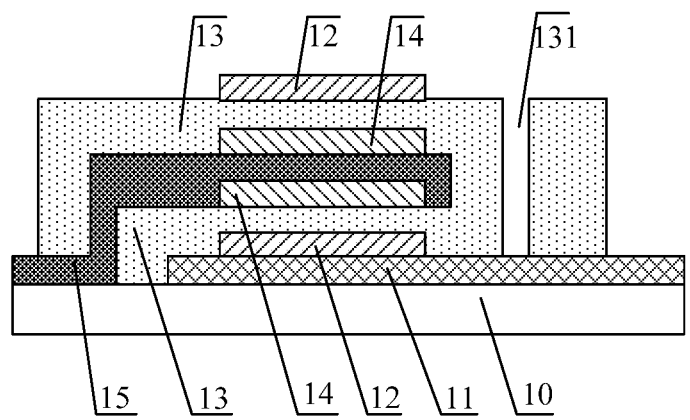
FIG. 15A is a schematic view for illustrating a method for fabricating an all-solid-state lithium battery in an embodiment of the present disclosure.
Figure 15B:
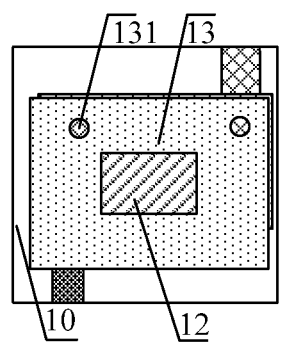
FIG. 15B is a top view of FIG. 15A.

Step 309, forming the cathode layer 12 on the electrolyte layer 13 by deposition, as particularly shown in FIGS. 15A and 15B.

Figure 16A:
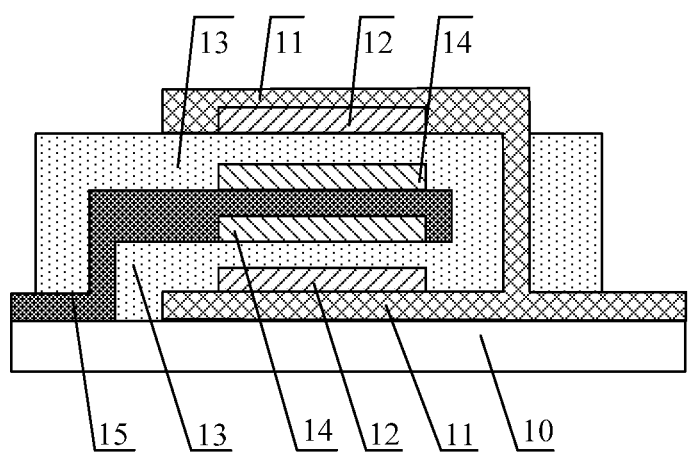
FIG. 16A is a schematic view for illustrating a method for fabricating an all-solid-state lithium battery in an embodiment of the present disclosure.
Figure 16B:
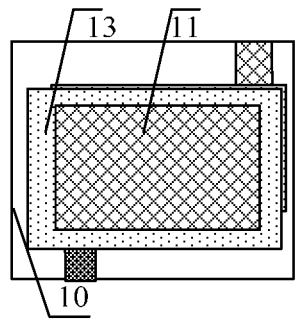
FIG. 16B is a top view of FIG. 16A.

Step 310, forming the cathode collector layer 11 and the cathode collector connection part 110 on the cathode layer 12 by deposition, to form the second layer of lithium battery unit, as particularly shown in FIGS. 16A and 16B.

The cathode collector connection part 110 connects the cathode collector layer of the second layer of lithium battery unit and the cathode collector layer of the first layer of lithium battery unit by means of the first via 131.

Figure 17A:
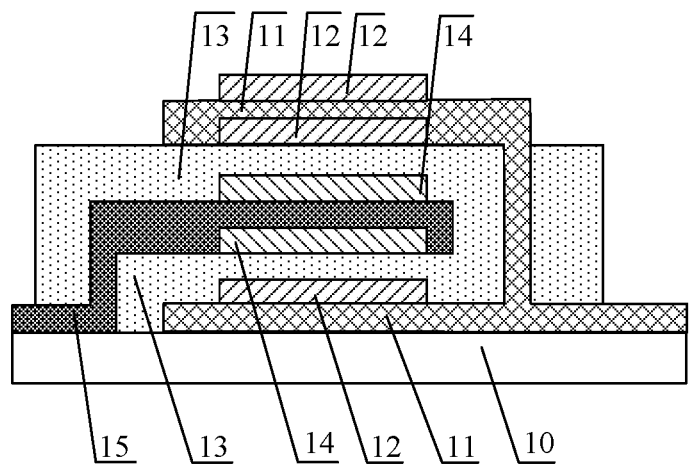
FIG. 17A is a schematic view for illustrating a method for fabricating an all-solid-state lithium battery in an embodiment of the present disclosure.
Figure 17B:
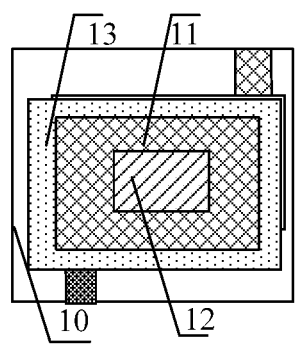
FIG. 17B is a top view of FIG. 17A.

Step 311, forming the cathode layer 12 on the cathode collector layer 11 by deposition, as particularly shown in FIGS. 17A and 17B.

Figure 18A:
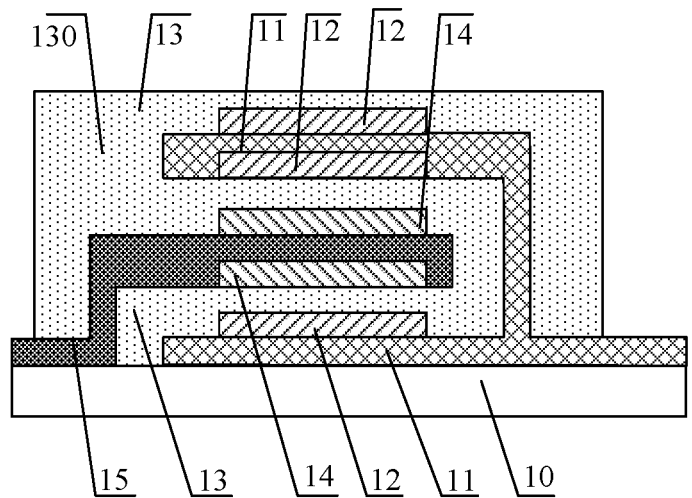
FIG. 18A is a schematic view for illustrating a method for fabricating an all-solid-state lithium battery in an embodiment of the present disclosure.
Figure 18B:
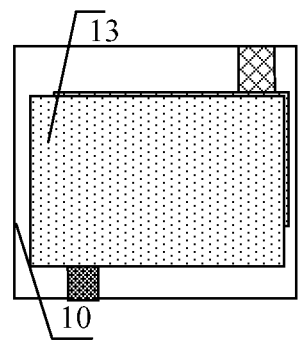
FIG. 18B is a top view of FIG. 18A.

Step 312, forming the electrolyte layer 13 and the electrolyte connection part 130 on the cathode layer 12 by deposition, as particularly shown in FIGS. 18A and 18B.

Figure 19A:
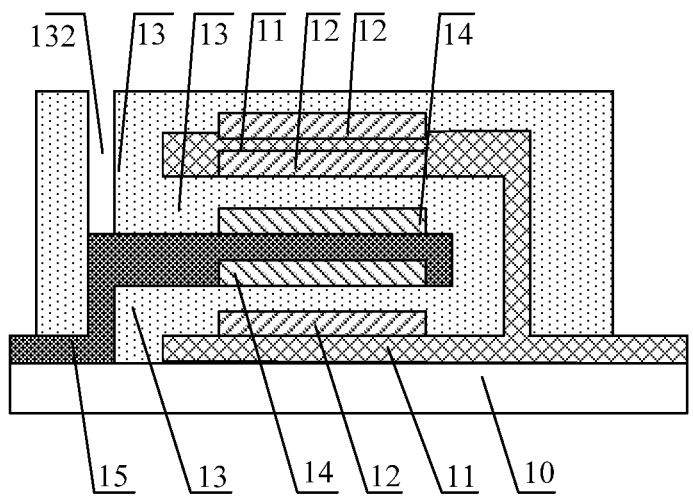
FIG. 19A is a schematic view for illustrating a method for fabricating an all-solid-state lithium battery in an embodiment of the present disclosure.
Figure 19B:
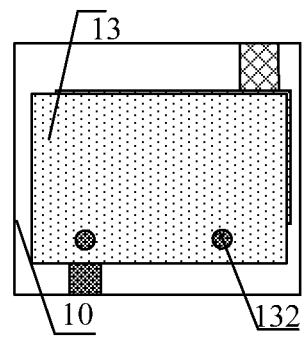
FIG. 19B is a top view of FIG. 19A.

Step 313, forming the second via 132 in the electrolyte connection part 130 by etching, as particularly shown in FIGS. 19A and 19B. As an example, the number of the second via 132 is two.

Figure 20A:
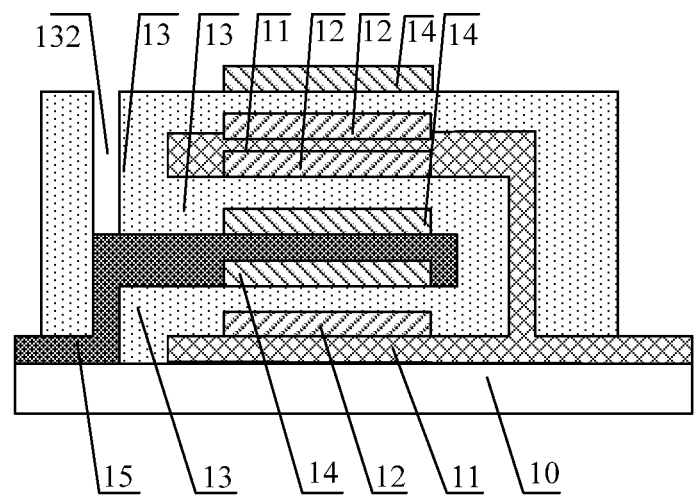
FIG. 20A is a schematic view for illustrating a method for fabricating an all-solid-state lithium battery in an embodiment of the present disclosure.
Figure 20B:
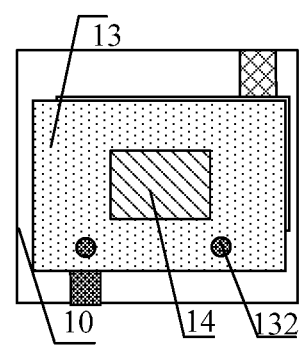
FIG. 20B is a top view of FIG. 20A.

Step 314, forming the anode layer 14 on the electrolyte layer 13 by evaporation, as particularly shown in FIGS. 20A and 20B.

Step 315, forming the anode collector layer 15 and the anode collector connection part 150 on the anode layer 14 by deposition, as particularly shown in FIGS. 2A and 2B.

In particular, the anode collector connection part 150 connects the anode collector layer of the third layer of lithium battery unit and the anode collector layer of the second layer of lithium battery unit by means of the second via 132. In some embodiments, steps 306-315 can be repeated to alternately form the plurality of layers of lithium battery units.

Hereinafter, the method for fabricating an all-solid-state lithium battery in an embodiment of the present disclosure will be further described with reference to FIG. 3, FIGS. 7A-8B and FIGS. 21A-31, by taking an example in which the all-solid-state lithium battery comprises three layers of lithium battery units, the cathode collector layer is firstly arranged on the substrate, and the cathode collector layer or the anode collector layer are connected at the periphery of the electrolyte layer.

Step 401, forming the cathode collector layer 11 on the substrate 10, as particularly shown in FIG. 7A and FIG. 7B.

Step 402, forming the cathode layer 12 on the cathode collector layer 11, as particularly shown in FIGS. 8A and 8B.

Figure 21A:
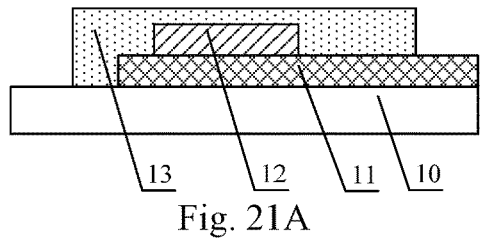
FIG. 21A is a schematic view for illustrating a method for fabricating an all-solid-state lithium battery in an embodiment of the present disclosure.
Figure 21B:
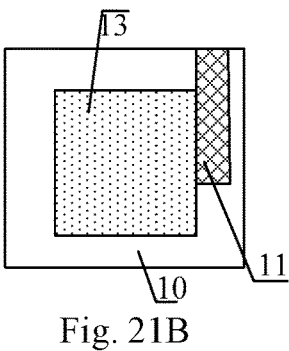
FIG. 21B is a top view of FIG. 21A.

Step 403, forming the electrolyte layer 13 on the cathode layer 12 by deposition, as particularly shown in FIGS. 21A and 21B.

Figure 22A:
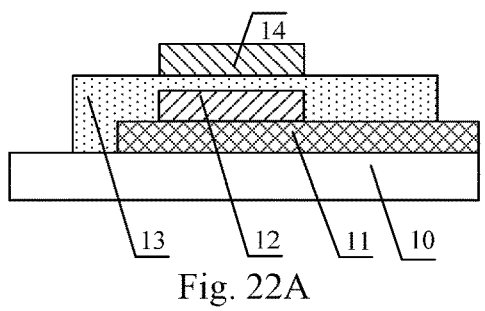
FIG. 22A is a schematic view for illustrating a method for fabricating an all-solid-state lithium battery in an embodiment of the present disclosure.
Figure 22B:
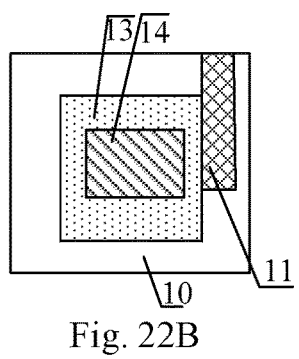
FIG. 22B is a top view of FIG. 22A.

Step 404, forming the anode layer 14 on the electrolyte layer 13 by evaporation, as particularly shown in FIGS. 22A and 22B.

Figure 23A:
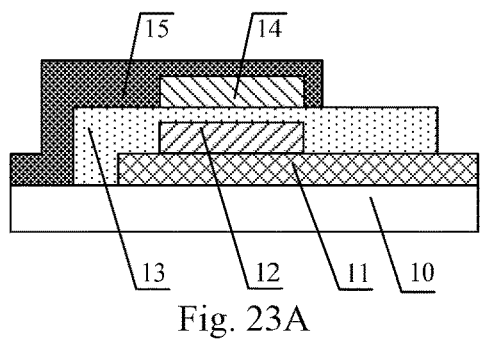
FIG. 23A is a schematic view for illustrating a method for fabricating an all-solid-state lithium battery in an embodiment of the present disclosure.
Figure 23B:
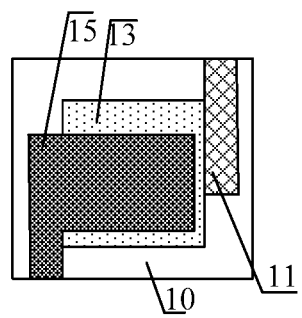
FIG. 23B is a top view of FIG. 23A.

Step 405, forming the anode collector layer 15 on the anode layer 14 by deposition, to form the first layer of lithium battery unit, as particularly shown in FIGS. 23A and 23B.

In particular, the anode collector layer 15 can cover at least a portion of the left side of the electrolyte layer 13.

In particular, the distance between the left side of the electrolyte layer and the left side of the substrate is larger than the distance between the left side of the anode collector layer and the left side of the substrate, and the distance between the right side of the electrolyte layer and the right side of the substrate is smaller than the distance between the right side of the anode collector layer and the right side of the substrate.

Figure 24A:
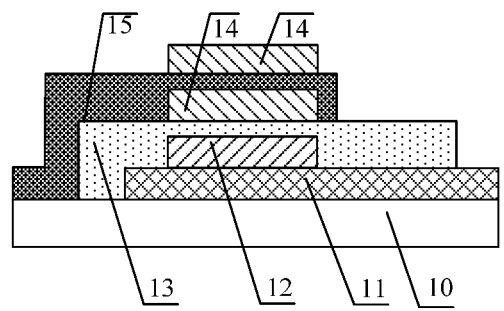
FIG. 24A is a schematic view for illustrating a method for fabricating an all-solid-state lithium battery in an embodiment of the present disclosure.
Figure 24B:
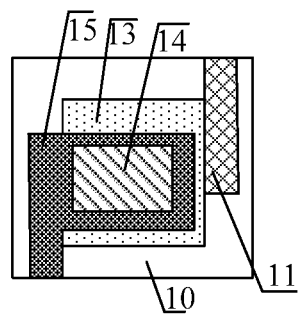
FIG. 24B is a top view of FIG. 24A.

Step 406, forming the anode layer 14 on the anode collector layer 15 by evaporation, as particularly shown in FIGS. 24A and 24B.

Figure 25A:
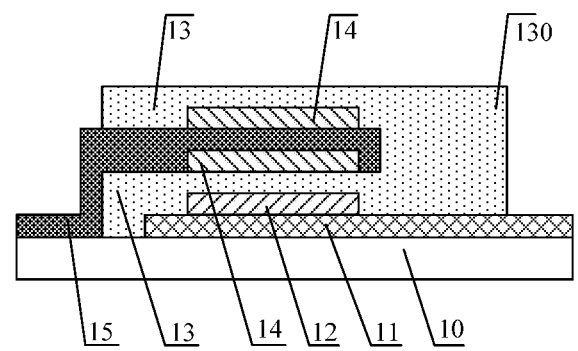
FIG. 25A is a schematic view for illustrating a method for fabricating an all-solid-state lithium battery in an embodiment of the present disclosure.
Figure 25B:
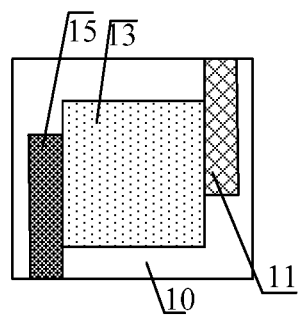
FIG. 25B is a top view of FIG. 25A.

Step 407, forming the electrolyte layer 13 and the electrolyte connection part 130 on the anode layer 14 by deposition, as particularly shown in FIGS. 25A and 25B.

Figure 26A:
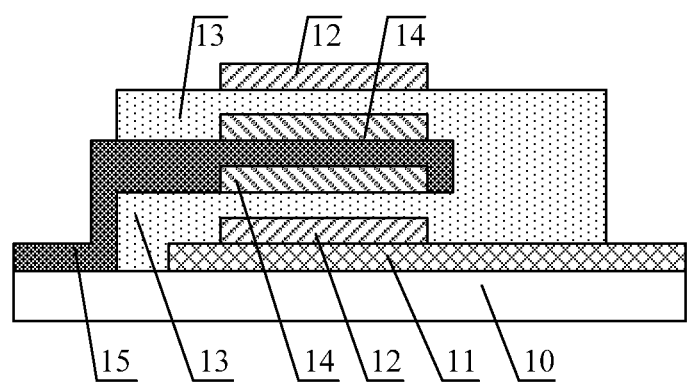
FIG. 26A is a schematic view for illustrating a method for fabricating an all-solid-state lithium battery in an embodiment of the present disclosure.
Figure 26B:
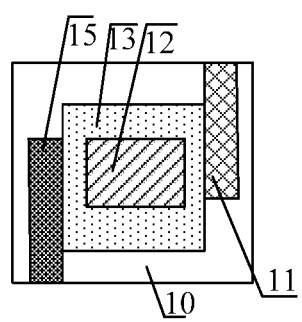
FIG. 26B is a top view of FIG. 26A.

Step 408, forming the cathode layer 12 on the electrolyte layer 13 by deposition, as particularly shown in FIGS. 26A and 26B.

Figure 27A:
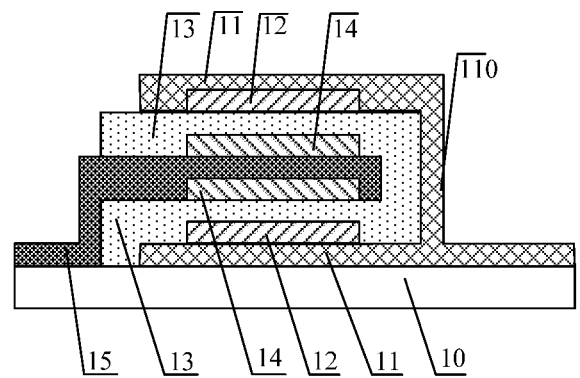
FIG. 27A is a schematic view for illustrating a method for fabricating an all-solid-state lithium battery in an embodiment of the present disclosure.
Figure 27B:
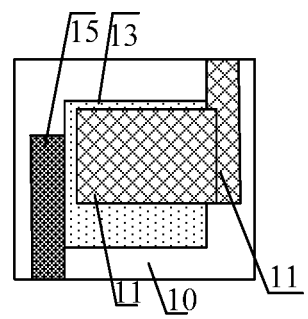
FIG. 27B is a top view of FIG. 27A.

Step 409, forming the cathode collector layer 11 and the cathode collector connection part 110 on the cathode layer 12 by deposition, to form the second layer of lithium battery unit, as particularly shown in FIGS. 27A and 27B.

The cathode collector layer of the second layer of lithium battery unit can cover at least a portion of the right side of the electrolyte layer 13.

Figure 28A:
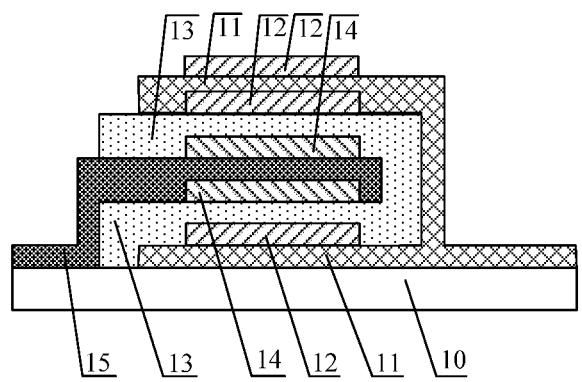
FIG. 28A is a schematic view for illustrating a method for fabricating an all-solid-state lithium battery in an embodiment of the present disclosure.
Figure 28B:
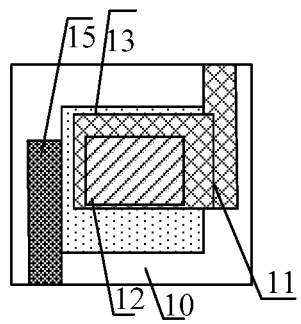
FIG. 28B is a top view of FIG. 28A.

Step 410, forming the cathode layer 12 on the cathode collector layer 11 by deposition, as particularly shown in FIGS. 28A and 28B.

Figure 29A:
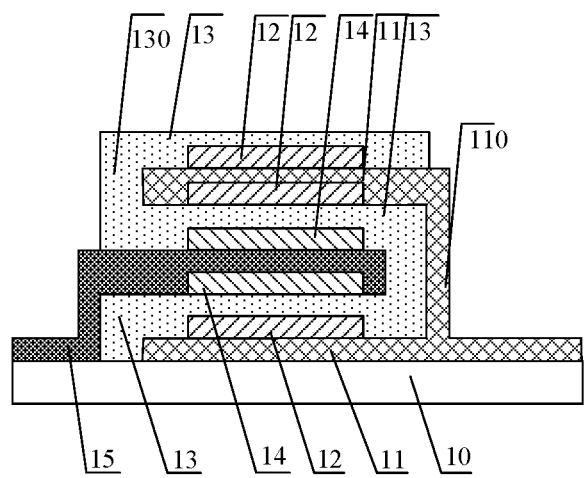
FIG. 29A is a schematic view for illustrating a method for fabricating an all-solid-state lithium battery in an embodiment of the present disclosure.
Figure 29B:
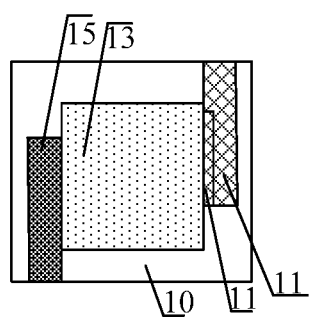
FIG. 29B is a top view of FIG. 29A.

Step 411, forming the electrolyte layer 13 and the electrolyte connection part 130 on the cathode layer 12 by deposition, as particularly shown in FIGS. 29A and 29B.

In particular, an orthogonal projection of the electrolyte layer of the third layer of lithium battery unit on the substrate can overlap an orthogonal projection of the electrolyte layer of the second layer of lithium battery unit.

Figure 30A:
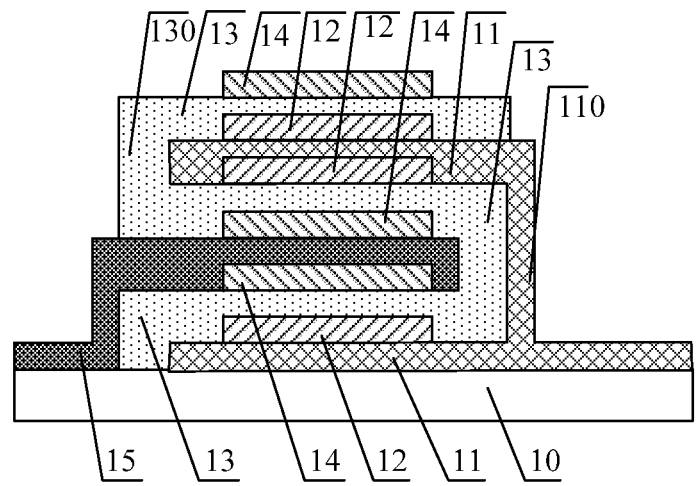
FIG. 30A is a schematic view for illustrating a method for fabricating an all-solid-state lithium battery in an embodiment of the present disclosure.
Figure 30B:
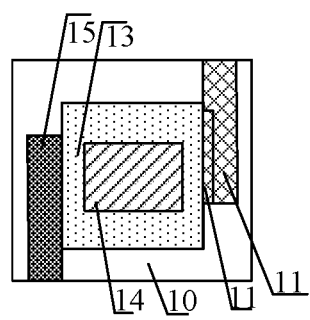
FIG. 30B is a top view of FIG. 30A.

Step 412, forming the anode layer 14 on the electrolyte layer 13 by evaporation, as particularly shown in FIGS. 30A and 30B.

Figure 31:
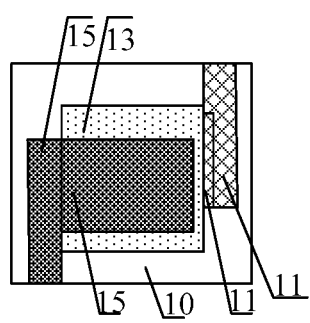
FIG. 31 is a top view of FIG. 3.

Step 413, forming the anode collector layer 15 and the anode collector connection part 150 on the anode layer 14 by deposition, as particularly shown in FIGS. 3 and 31.

In particular, the anode collector layer 15 surrounds the left side of the electrolyte layer 13 of the second layer of lithium battery unit and the electrolyte layer 13 of the third layer of lithium battery unit.

In some embodiments, steps 406-413 can be repeated to alternately form the plurality of layers of lithium battery units.

In some embodiments, the protection layer 20 can further be formed at the periphery of the all-solid-state lithium battery.

The drawings for embodiments of the present disclosure only relate structures which are involved in these embodiments, and the remaining structures can be designed with reference to common design.

For clarity, the thicknesses and size for layers or microstructures are magnified in drawings for describing embodiments of the present disclosure. It will be understood that when an element such as a layer, film, region, or substrate, is referred to as being "on", "below" another element, the element can be directly on or below the another element, or intervening elements may be present.

In the present disclosure, embodiments as well as features in embodiments can be combined with each other without conflict to form new embodiments.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. An all-solid-state lithium battery, comprising:
a substrate; and
a plurality of layers of lithium battery units stacked on the substrate, wherein each layer of lithium battery unit of the plurality of layers of lithium battery units comprises at least two electrode collector layers, a first electrode layer, an electrolyte layer, and a second electrode layer;
wherein two neighboring layers of lithium battery units share one of the electrode collector layers;
wherein the electrode collector layers comprise a first electrode collector layer and a second electrode collector layer, first electrode collector layers of the odd-numbered layer of lithium battery units are connected by a first electrode collector connection part, and second electrode collector layers of the even-numbered layer of lithium battery units are connected by a second electrode collector connection part;
wherein electrolyte layers of two neighboring layers of lithium battery units are connected by electrolyte connection part; and
wherein the electrolyte connection part is provided with a first via and a second via, the first via is provided with the first electrode collector connection part, which directly connects first electrode collector layers of respective lithium battery unit the second via is provided with the second electrode collector connection part, which directly connects second electrode collector layers of respective lithium battery unit and the first via and the second via only pass through the electrolyte connection part.

2. The all-solid-state lithium battery of claim 1, wherein each layer of lithium battery unit comprises: the first electrode collector layer, the first electrode layer, the electrolyte layer, the second electrode layer, and the second electrode collector layer, which are arranged in this order in a direction from the first electrode collector layer of said layer of lithium battery unit to the second electrode collector layer of said layer of lithium battery unit.

3. The all-solid-state lithium battery of claim 2, wherein the first electrode collector layer is a cathode collector layer, the first electrode layer is a cathode layer, the second electrode layer is an anode layer, and the second electrode collector layer is an anode collector layer.

4. The all-solid-state lithium battery of claim 2, wherein the first electrode collector layer is an anode collector layer, the first electrode layer is an anode layer, the second electrode layer is a cathode layer, and the second electrode collector layer is a cathode collector layer.

5. The all-solid-state lithium battery of claim 1, wherein the first via and the second via are perpendicular to the substrate.

6. The all-solid-state lithium battery of claim 1, wherein the electrolyte connection part and the electrolyte layer comprise a same material.

7. The all-solid-state lithium battery of claim 6, wherein the electrolyte layer is made from at least one of lithium phosphate, lithium oxide, and lithium titanium phosphate.

8. The all-solid-state lithium battery of claim 1, wherein the first electrode collector layer and the first electrode collector layer connection part comprise a same material, and the material comprises aluminum.

9. The all-solid-state lithium battery of claim 1, wherein the second electrode collector layer and the second electrode collector layer connection part comprise a same material, and the material comprises copper.

10. The all-solid-state lithium battery of claim 1, further comprising a protection layer, which is arranged at the periphery of the plurality of layers of lithium battery units.

11. The all-solid-state lithium battery of claim 1, wherein the first electrode collector connection part and the second electrode collector connection part contact the electrolyte layer directly.

* * * * *